United States Patent Office 2,812,148
Patented Nov. 5, 1957

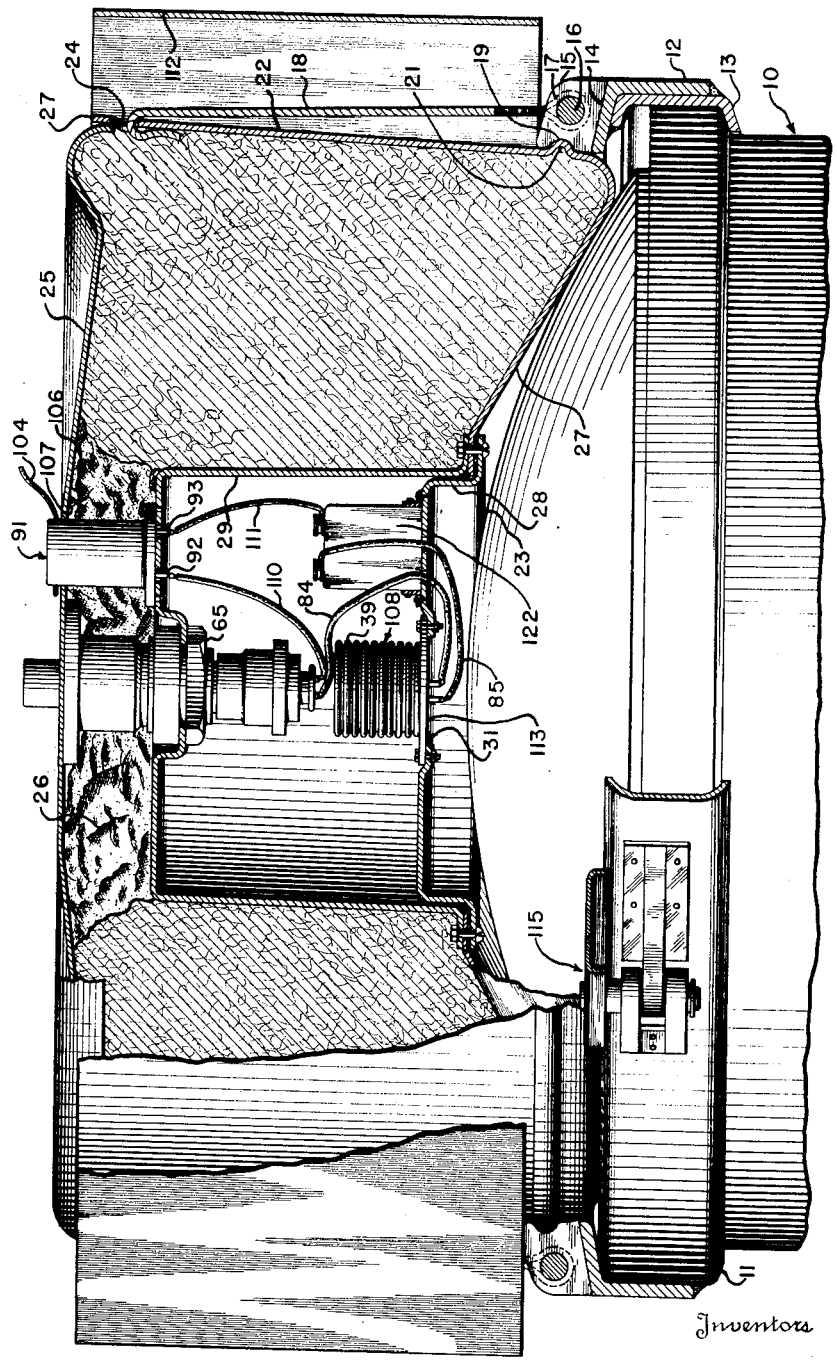

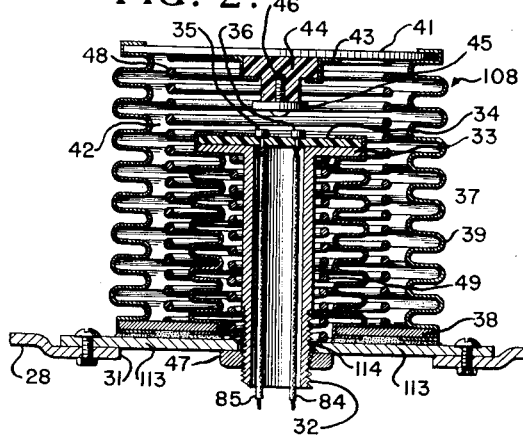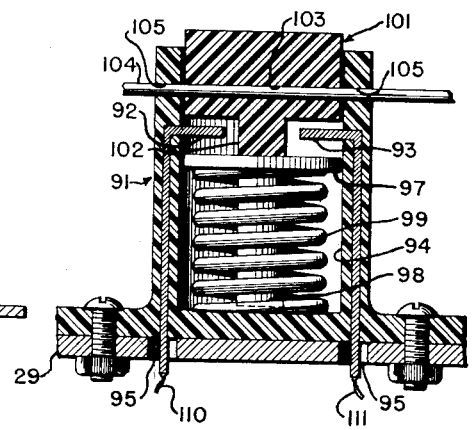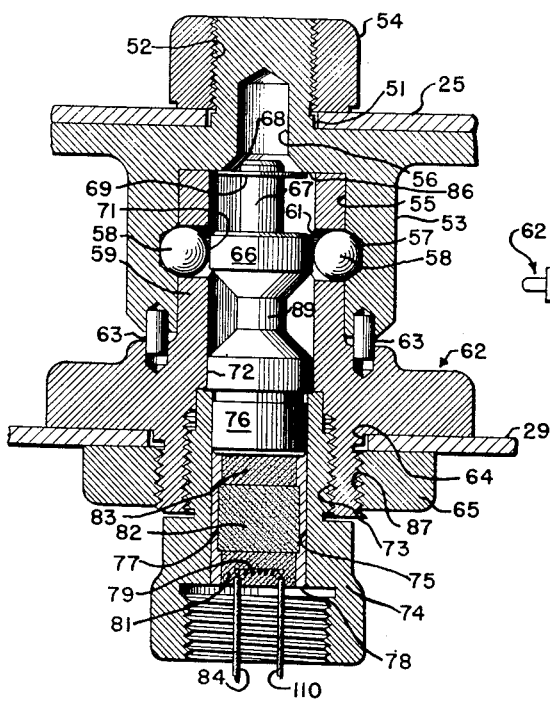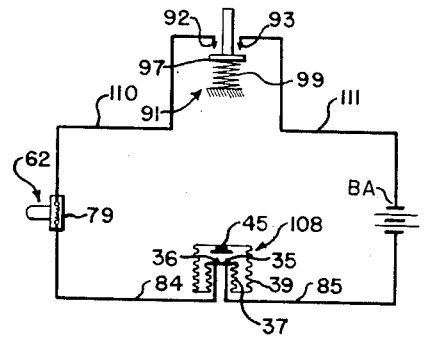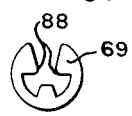

2,812,148

DELAYED OPENING PARACHUTE PACK

Gordon L. Fogal, Silver Spring, Md., and Graham B. Brown, Alexandria, Va.

Application September 7, 1949, Serial No. 114,444

4 Claims. (Cl. 244—150)

(Granted under Title 35, U. S. Code (1952), sec. 266)

This invention relates to parachute packs and more particularly to a release device for a parachute pack which is adapted to open the cover of the pack to release the parachute therefrom and thereby render the parachute effective to decelerate the descent of the mine when the mine has been released from an aircraft in flight and fallen free through the air to a preselected distance above the surface of the earth whereby the mine may be planted within a target area with a high degree of accuracy.

One of the objects of the present invention is to provide a new and improved mine parachute release mechanism which will retain a parachute within a casing until the mine and its parachute have fallen free of the launching aircraft.

Another object of the invention is to provide a release mechanism for a mine parachute which will retain the parachute within a casing until a predetermined interval has elapsed after the mine has fallen free of the launching aircraft and when the barometric pressure has reached a predetermined value.

Still another object of the present invention is to provide a release mechanism for a mine parachute which will retain the parachute within a casing until the lapse of a predetermined period of time after the barometric pressure on the mechanism reaches a predetermined value.

Another of the objects is the provision of a new and improved device for releasing a cover and parachute from a parachute casing in which the release is effected by firing an explosive charge at the termination of a predetermined interval when the atmospheric pressure reaches a preselected value as the device descends from an aircraft.

Other objects and many of the attendant advantages of this invention will be readily appreciated as the same becomes better understood by reference to the following detailed description when considered in connection with the accompanying drawings wherein:

Fig. 1 is a side elevation, partly broken away, of the parachute pack and mechanism for releasing the cover therefrom according to the preferred form of the invention;

Fig. 2 is a somewhat enlarged sectional view of the barometric pressure responsive switch employed in connection with the present invention for partially closing the firing circuit thereby rendering the firing circuit effective to release the cover from the parachute casing when the firing circuit becomes fully closed a predetermined interval after the atmospheric pressure on the switch reaches a preselected value;

Fig. 3 is somewhat enlarged sectional view of the arming switch of the present invention for closing a portion of the firing circuit as the mine is launched from the aircraft;

Fig. 4 is somewhat enlarged sectional view of the locked cover latch which releasably locks the cover to the parachute casing;

Fig. 5 illustrates diagrammatically the firing circuit employed in the present invention which operates to render the firing circuit effective thereby to release the parachute from the parachute casing when the circuit becomes fully closed a predetermined interval after the atmospheric pressure reaches a preselected value; and Fig. 6 is a plan view of the retaining ring employed in connection with the cover latch for releasably locking the cover to the parachute casing.

Referring now to the drawings in which like numerals of reference indicate like parts throughout the several views, and more particularly to Fig. 1 there is shown thereon a mine generally designated 10 of the type adapted to be launched from an aircraft in flight and having a flanged portion 11 and a spherical portion 23 formed on the tail of the mine. A securing ring 12, having inwardly extending flanged portions 13 and 14, lock the securing ring to the flanged portion 11. Securing ring 12 is provided with a release device, generally designated 115, which is adapted to operate to release the mine 10 from securing ring 12 as the mine enters a body of water, the structure and operation of the release device being more fully set forth in the copending application of Alvin C. Hall et al. entitled "Parachute Release Mechanism," filed April 20, 1949, Serial No. 88,872. Securing ring 12 is also provided with a plurality of members 15 spaced along the ring, welded thereto, and extended vertically therefrom, each of the members having a bolt 16 secured to the member for attaching the looped ends 17 of the shroud lines 18. Each of the members 15 are provided with a grooved portion 19 for receiving the crimp 21 formed about the side of the parachute casing 22 for securing the casing to members 15. Casing 22 is formed with an inwardly extending crimped portion 24 for providing a seat for an interfitting cover 25 for enclosing a parachute 26. Cover 25 is provided with an eye bolt 107 secured thereto in any well known manner for receiving a looped end of static line 106, the other end of the static line being stitched to the crown of the parachute 26. Casing 22 is also provided with vertical fins 112 for guiding the mine 10 through the air as the mine descends from the launching aircraft and slots 27 formed in the rim of the casing for receiving shroud lines 18 therein, the other ends of the shroud lines (not shown) being stitched to the hem of the parachute 26. The casing 22 is formed with an inwardly extending portion 27 to which is bolted base plate 28 and casing 29 for enclosing the latch mechanism which releases the cover 25 and parachute 26 from the casing 22 as the release device operates in response to atmospheric pressure of predetermined value on the device corresponding to a preselected distance above the earth and at the termination of a predetermined interval of time after said predetermined pressure is reached.

Base plate 28 has a storage battery 122 bolted thereon and is provided with an inwardly extending flange portion forming a centrally disposed opening 31 which is closed by plate 113 bolted to the flange portion. Plate 113 is provided with an axial opening 114, Fig. 2, through which is slideably arranged a tubular threaded adjusting bolt 32. The inner end of adjusting bolt 32 is provided with an outwardly extending flange portion 33 on which is secured in air-tight relation a non-conducting cover 34 having a pair of electric contacts 35 and 36 molded within cover 34. The contacts 35 and 36 are provided with a pair of conductors 84 and 85 which extend through bolt 32 and outwardly therefrom. An inner flexible metallic bellows 37 is formed in air-tight relation with the flange portion 33, cover 34 and base disc 38. An outer flexible metallic bellows 39 is formed in air-tight relation with base disc 38 and cover plate 41 to form a sealed chamber 42 which has a substantial amount of the air evacuated therefrom to form a partial vacuum within the chamber 42. The cover plate 41 has secured thereto as by welding, brazing or the like, a cup member 43 into which is molded insulating washer 44 with a set screw 46 engaging the washer and the electroconducting contact bridging disk 45 to secure the parts together.

The adjusting bolt 32 is in threaded engagement with adjusting nut 47 for adjustably positioning contacts 35 and 36 with relation to contact disk 45. Compression spring 48 is disposed under compression between cover plate 41 and base disk 38 to yieldably urge the cover plate away from the disk. A second compression spring 49 disposed about bolt 32, is interposed under compression between base disk 38 and flange portion 33 to yieldably urge contacts 35 and 36 into engagement with contact disk 45.

It may be readily seen that as the atmospheric pressure surrounding bellows 39 is increased to compress the bellows, contact disk 45 will move into engagement with contacts 35 and 36 to form an electrical connection between conductors 84 and 85.

In accordance with the arrangement of the present invention, the aforedescribed switch arrangement comprises a barometric pressure responsive device, generally designated 108, for partially closing an electric circuit, Fig. 5, when the barometric pressure surrounding the device reaches a preselected value to initiate operation of the parachute release mechanism, as will hereinafter be more fully disclosed.

Cover 25 is provided with a centrally disposed opening 51, as shown in Fig. 4, for receiving threaded portion 52 of housing 53. Threaded portion 52 engages lock nut 54 for clamping housing 53 to the cover 25. Housing 53 is provided with an axial bore 55 and an interconnecting reduced bore 56 to form a shoulder at 86. Slideably arranged within bore 55 is a cylindrical portion 59 of the release member 62 which is provided with a plurality of horizontally disposed circular openings 61 into which are loosely fitted locking balls 58. A pair of centering pins 63, slideably arranged within suitable bores formed within housing 53 and release member 62 are provided for assembling the parts in alignment with each other. Release member 62 is provided with threaded extension 87 disposed through suitable opening 64 formed in casing 29 with lock nut 65 engaging extension 87 for securing release member 62 to the casing 29. Slideably arranged within the cylindrical portion of release member 62 is a spool-shaped release piston 66 having a cylindrical extension 67 formed thereon. The extension 67 is provided with a peripheral groove 68 formed therein for receiving the inwardly extending projections 88 of yieldable retaining ring 69, shown more clearly in Fig. 6, which engages shoulder 86 when the parts are in the assembled position of Fig. 4. Spool-shaped release piston 66 is provided with a necked down portion 89 and a pair of enlarged piston portions 71 and 72 slideably arranged within the cylindrical portion of release member 62, piston portion 71 being arranged to retain locking balls 58 within groove 57 when assembling the parts together.

Release member 62 is provided with an internally threaded portion 73 for threadably engaging detonator housing 74. Detonator housing 74 is provided with an axial bore 75 into which is slideably arranged piston 76 and cylindrical portion 77 of detonator casing 78.

The mechanism for initiating the operation to release the cover from the parachute casing comprises an electroresponsive firing device or detonator unit formed of a heating element 79 molded within a pyrotechnic substance 81 adapted to ignite when heated by the heating element; a time delay element 82, adapted to burn along its length for a predetermined interval such, for example, as 5 seconds after being ignited and to thereafter fire explosive mixture 83 after element 82 has burned along its length. The pyrotechnic substance 81, time delay element 82, and explosive mixture 83 are molded within the cylindrical portion 77 of detonating casing 78 and arranged to abut piston 76.

Conductors 84 and 110 connected to heating element 79, extend outwardly of the detonator casing 78, one of said conductors 84 being connected to terminal 36 of the barometric device 108, the other conductor 110 being connected to contact terminal 92 of an arming device generally designated 91. The other terminal 93 of the arming device is connected by a conductor 111 to one side of a battery BA, the other side of the battery being connected by conductor 85 to contact terminal 35 of barometric device 108.

The arming device 91 of generally cylindrical configuration and formed of phenolic material which is molded about the pair of contact terminal members 92 and 93 which extend inwardly of the bore 94 provided in the arming device. The arming device 91 is bolted to casing 29 in registry with suitable openings 95 provided therefor for bringing terminals 92 and 93 within the casing. Arming device 91 is also provided with a piston 97 formed of electroconducting material and having a piston rod 98 extending therefrom. Piston 79 is slideably arranged within bore 94 and interposed between members 92 and 93 and the base of bore 94.

Sleeved about piston rod 98 and interposed under compression between piston 97 and the base formed by bore 94 is a compression spring 99 which yieldably urge piston 97 into engagement with contact members 93.

Hold-off piston 101, formed of non-conducting material, is slideably arranged within bore 94, the piston 101 having a depending axial projection 102 which is initially maintained in abutting engagement with piston 97, and also having a diametrical bore 103 through the piston. An arming wire 104, one end of which is secured to the aircraft structure, and the other end of which is threaded through radial bores 105 formed in the arming device 91 and bore 103, is provided for maintaining pistons 97 and 101 depressed against spring 99 until the arming wire is extracted, thereby to separate piston 97 from engagement with contact members 92 and 93.

As the mine falls free of the aircraft, arming wire 104 is withdrawn from bores 105 and 103 and spring 91 operates to move piston 97 into electrical engagement with contacts 92 and 93 to close the arming switch 91, thereby to partially arm or complete a portion of the firing circuit shown in Fig. 5.

As the mine descends through the air, the atmospheric pressure surrounding the mine grandually increases to gradually compress bellows 39, thereby to move disk 45 downwardly until the disk moves into engagement with contacts 35 and 36 to complete the firing circuit whereupon the heating element 79 becomes energized.

When the heating element is energized, pyrotechnic material 81 is ignited to initiate the burning of time delay element 82 which burns for a preselected interval such, for example as 5 seconds, to then fire the explosive mixture 83. Explosive mixture 83 propels pistons 76 and 66 upward to force projections 88 of yieldable member 69 out of groove 68 in piston extension 67 and simultaneously to move necked down portion 89 into registry with balls 58 to cause the balls to move out of groove 57 to free housing 53 and cover 25 from release member 62. As cover 25 moves into the air stream it acts as a pilot chute to pull the static line 106 and parachute 26 secured to the line from the casing 22 to cause the parachute to open and thereafter to decelerate the descent of the mine as the mine approaches the target area.

In order to prevent the parachute from becoming entangled with the aircraft should the mine inadvertently become released from the aircraft in a zone where the barometric pressure is greater than the setting of barometric device 108, the time delay element 82 is provided for delaying the release of the cover 25 and the parachute 26 until 5 seconds have elapsed while the mine is falling free of the aircraft.

Retaining ring 69 is provided to prevent movement of piston 66 into ball releasing position in response to shock resulting from handling of the mine during transportation and launching thereof.

Obviously many modifications and variations of the present invention are possible in the light of the above teachings. It is therefore to be understood that within the scope of the appended claims the invention may be practiced other than as specifically described.

The invention herein described and claimed may be manufactured and used by or for the Government of the United States of America for governmental purposes without payment of any royalties thereon or therefor.

What is claimed as new and desired to be secured by Letters Patent of the United States is:

1. A mechanism of the character disclosed for releasing a parachute for a mine from a parachute casing above the surface of the earth in response to barometric pressure corresponding to a predetermined altitude as the mine descends from the launching aircraft, comprising a mine adapted to be launched from an aircraft in flight, a cup member secured to said mine and having the parachute disposed therein, a plurality of shroud lines secured to the hem of the parachute and to said mine, a latch slideably arranged within said cup member for movement from an initial locking position to a release position, a cover carried by said cup member and secured to the crown of said parachute for enclosing said parachute within the cup member and adapted to be locked to said cup by said latch when said latch is in said initial locking position, means for releasably locking said latch in said initial position sufficiently to prevent the movement of the latch to said release position in response to a shock received by the mine prior to the launching thereof, a small explosive charge arranged within said cup member in substantial abutting relation with one end of said latch for moving the latch to said release position as the charge is fired, a firing circuit including a storage battery for firing said charge when the battery is connected to said charge, an arming device for partially closing said firing circuit as the mine is released from the launching craft, and barometric pressure responsive means for fully closing said firing circuit to the battery as the atmospheric pressure thereon reaches the value corresponding to said predetermined altitude.

2. A mechanism of the character disclosed for releasing a parachute from a parachute pack above the surface of the earth in response to barometric pressure corresponding to a preselected altitude as the mechanism falls free from the launching aircraft, a cup member for packing the parachute therein, a plurality of shroud lines for securing the parachute to said cup member, a cover carried by said cup member and secured to the parachute crown for enclosing the parachute within the cup member, locking means including a plurality of balls for releasably locking the cover to the cup member, a piston for releasably retaining said plurality of balls in the locking position thereof and adapted to be moved into a position for releasing the balls thereby to effect release of the locking means, a yieldable member in releasable locking engagement with said locking means and said piston for releasably locking said locking means to said piston, an explosive charge arranged within said cup member in proximate spaced relation with respect to said piston for moving said piston into position for releasing said balls from said locking position when the charge is fired, electroresponsive means for firing said explosive charge, a source of electric energy within said cup member for firing said charge as the electric energy source is connected thereto, and a pressure responsive switch for connecting said electric energy source with said electroresponsive means when a predetermined atmospheric pressure corresponding to said preselected altitude is applied to the switch.

3. A mechanism of the character disclosed for releasing a mine parachute from a parachute pack above the surface of the earth in response to barometric pressure corresponding to a preselected altitude as the mine falls free of the launching aircraft comprising, in combination, a cup member secured to the mine for disposing the parachute therein, a plurality of shroud lines on said parachute for securing the parachute to the mine, a cover carried by said cup member and secured to the crown of the parachute for enclosing the parachute within said cup member, means including a plurality of balls for releasably locking said cover to said cup member, an explosive charge for releasing said locking means when the explosive charge is fired, electroresponsive means for firing said explosive charge, a battery for energizing said electroresponsive means as the battery is connected thereto, means including a pressure responsive switch adapted to connect said battery to said electroresponsive means as the switch closes in response to a predetermined pressure developed thereon, corresponding to said preselected altitude, and time delay means included in said electroresponsive firing means and constructed and arranged to fire said charge in predetermined time delayed relation to closing of said switch.

4. In a mechanism for releasing a parachute from the pack therefor in response to barometric pressure corresponding to a preselected altitude, the combination of a base member, inner and outer members expansible and contractible in response to changes in barometric pressure thereon and sealed to said base member, coacting switch members respectively carried by said inner and outer members, means for yieldably separating said switch members, means settable at will for initially spacing the switch members in accordance with a preselected altitude so that the switch members will become closed as barometric pressure corresponding to said preselected altitude is applied to said expansible and contractible members, separable means comprising said pack for releasably enclosing said parachute, means including an explosive charge for separating said separable means, and a firing circuit including said switch members and arranged to render said circuit effective to fire said explosive charge as the switch members become closed.

References Cited in the file of this patent

UNITED STATES PATENTS

| | | |
|---|---|---|
| 847,198 | Maul | Mar. 12, 1907 |
| 2,342,096 | Zimmerman | Feb. 15, 1944 |
| 2,467,024 | Freider | Apr. 12, 1949 |
| 2,478,758 | Frieder | Aug. 9, 1949 |

FOREIGN PATENTS

| | | |
|---|---|---|
| 585,265 | Great Britain | Feb. 3, 1947 |